Aug. 22, 1933.  H. LEFKOWITZ ET AL  1,923,834
CLOTH CUTTING MACHINE
Filed July 24, 1930   3 Sheets-Sheet 2
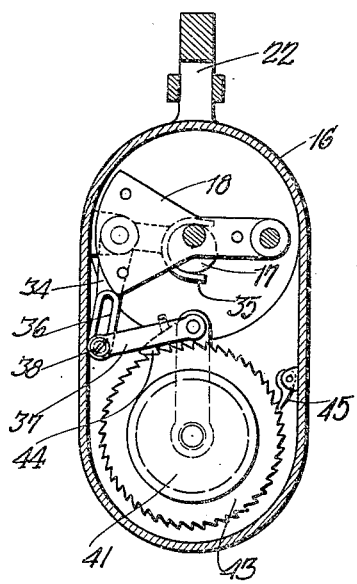
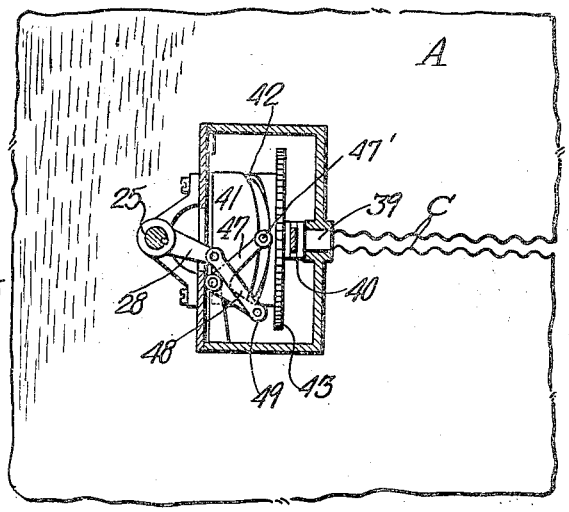
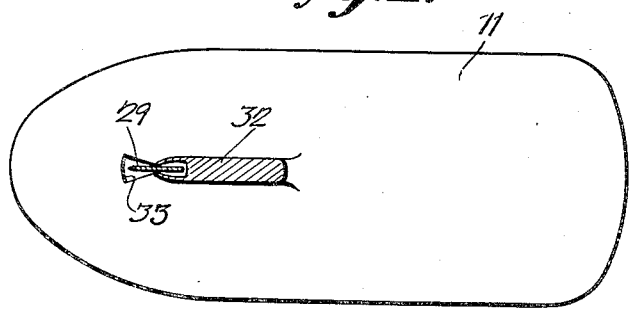
Inventor
HARRY LEFKOWITZ.
GABRIEL KLEIN.
By Clarence A. O'Brien
Attorney

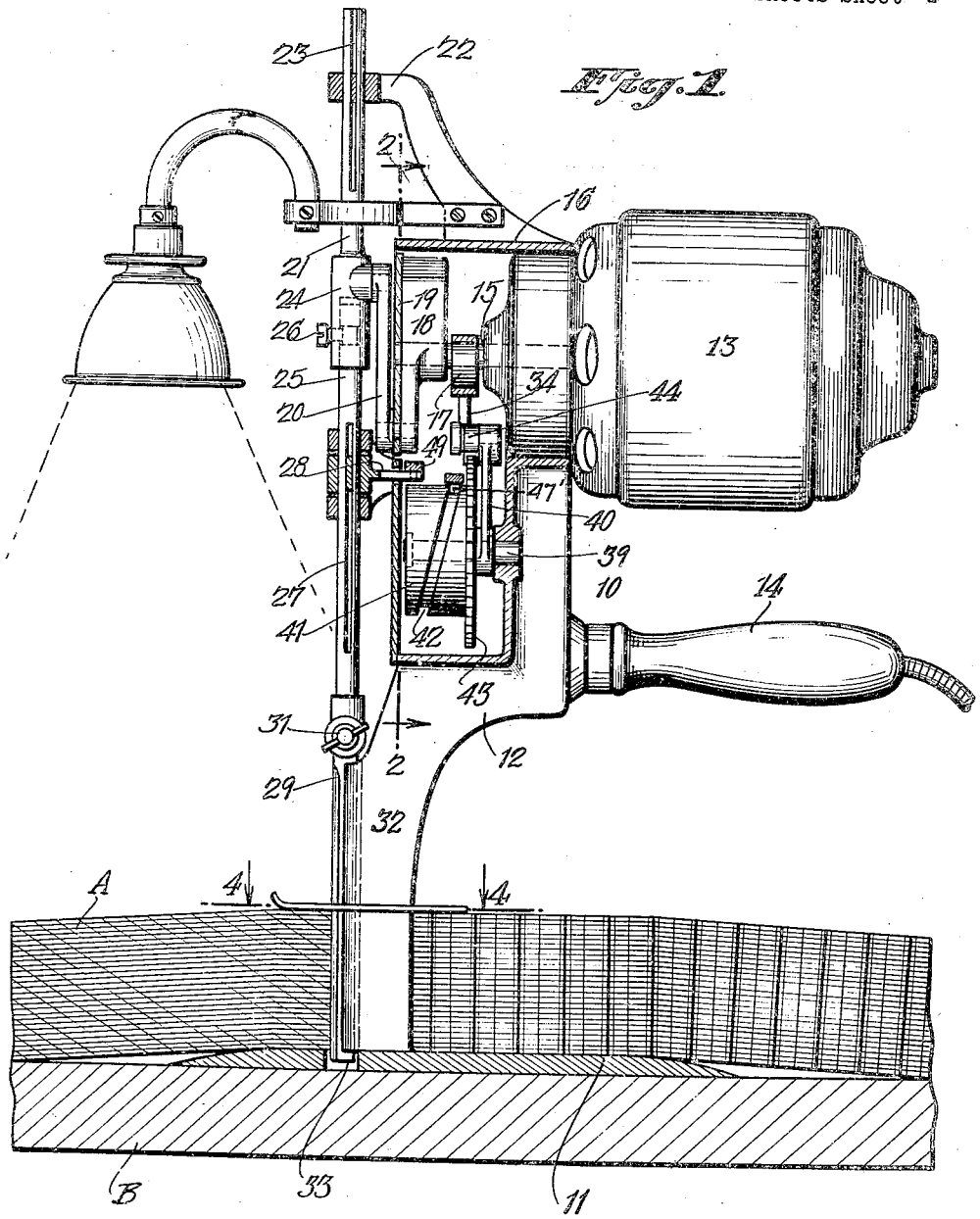

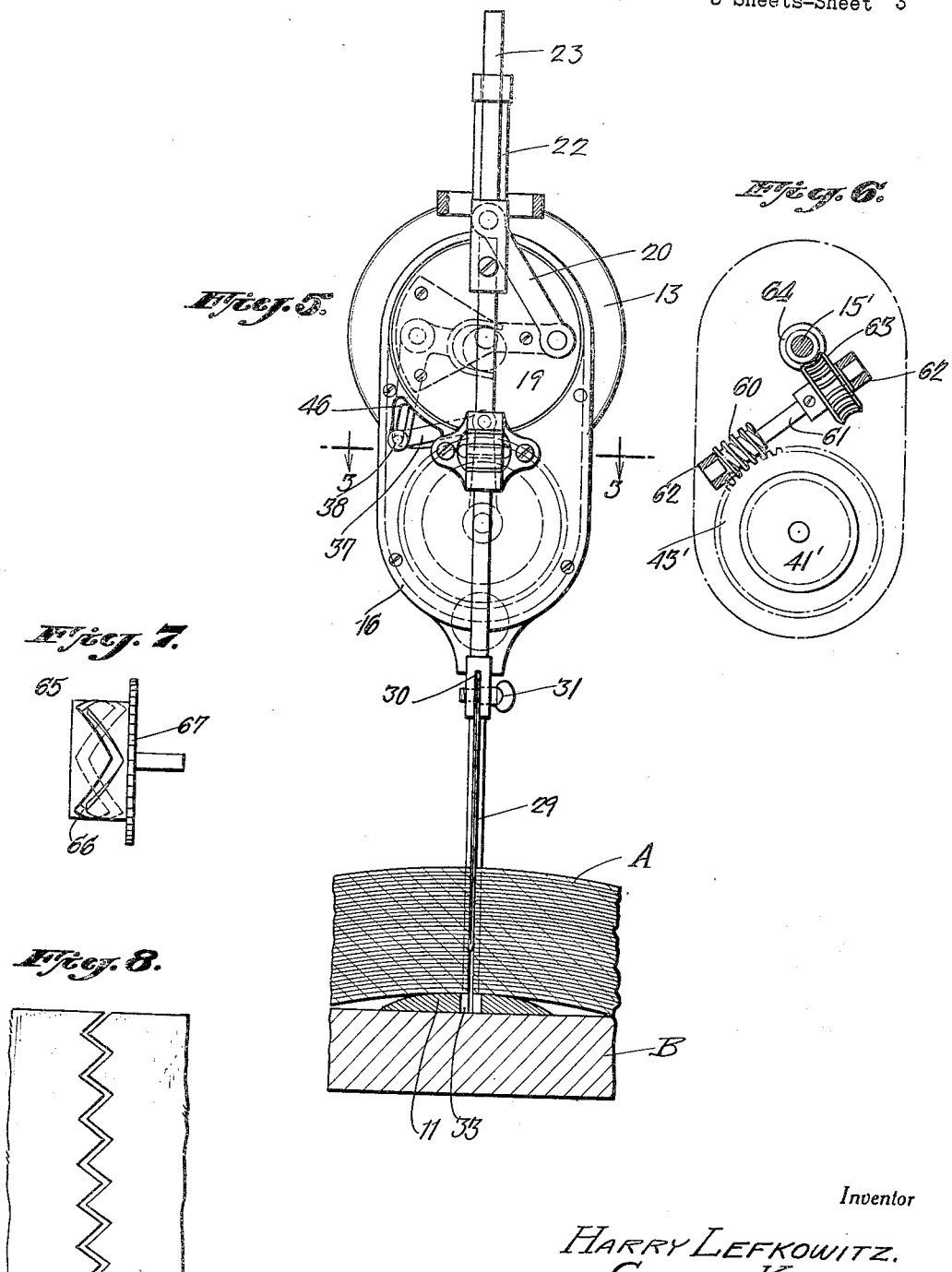

Patented Aug. 22, 1933

1,923,834

UNITED STATES PATENT OFFICE 1,923,834

CLOTH CUTTING MACHINE

Harry Lefkowitz and Gabriel Klein, Brooklyn, N. Y., assignors to Harry L. Frumovitz, Brooklyn, N. Y.

Application July 24, 1930. Serial No. 470,494

11 Claims. (Cl. 164—75)

This invention relates to improvements in cloth cutting machines, and has particular reference to a machine for cutting a pinking or scalloped edge on textile fabrics.

The primary object of the invention resides in the construction of a cutting machine which will cut a pinking edge on fabrics laid upon a cutting table in layers or plies, and which machine may be adjusted to cut a straight edge thereby providing one machine to cut an irregular or straight edge as desired.

Another object of the invention is to provide a cutting machine with a turnable and reciprocating knife, and mechanism for changing the angularity of the knife blade simultaneously and automatically during reciprocation of the same.

A still further object is the provision of a pinking edge cutting machine which is operated in the identical manner as the ordinary cloth cutting machine so as to be easily operated by one skilled in the art.

With these and other objects in view, the invention resides in the certain novel construction, combination and arrangement of parts, the essential features of which are hereinafter fully described, are particularly pointed out in the appended claims, and are illustrated in the accompanying drawings, in which:—

Figure 1 is a side elevational view of my improved cloth cutting machine with parts broken away in section.

Figure 2 is a vertical transverse sectional view on the line 2—2 of Figure 1.

Figure 3 is a horizontal sectional view on the line 3—3 of Figure 1.

Figure 4 is a detail horizontal sectional view on the line 4—4 of Figure 1.

Figure 5 is a front elevational view with parts broken away in section.

Figure 6 is a detail sectional view illustrating a modified form of cam driving means.

Figure 7 is a detail elevational view of a modified form of cam.

Figure 8 is a fragmentary plan view of a piece of fabric showing the type of cut produced by the cam shown in Figure 7.

Referring to the drawings by reference characters, the numeral 10 designates my improved cloth cutting machine in its entirety and which includes a base or foot 11 from which a bracket 12 rises for supporting the mechanism now to be explained. Supported upon the bracket 12 is an electric motor 13, and extending from the bracket below the motor is a manipulating handle 14 which is grasped by the hand of an operator to move and guide the machine over the path to be cut. The motor shaft 15 extends into a housing 16 supported by the bracket 12 and which shaft is provided with an eccentric cam 17, while also fixed to the said shaft is a weighted crank 18, the latter being provided with a closure disc 19 for closing a portion of the front wall of the housing 16. Operatively connected to the crank 18 is one end of a link 20, the opposite end of the link being pivotally connected to the lower end of a slide rod 21, the said rod being slidably mounted in a bearing bracket 22, the bracket being provided with a key for reception in a key slot 23 provided in the said rod 21. The key and slot permits sliding movement of the rod, but prevents possible turning of the same for a purpose to be hereinafter appreciated. The lower end of the rod 21 is provided with a socket 24 and extending into the socket is the upper end of a turnable rod 25, the turnable rod being held connected to the guide rod 21 by a set screw 26. The turnable rod 25 is provided with an elongated key slot 27 and keyed to the said rod is an arm 28, the said arm extending through a slot into the housing 16. By keying the arm 28 to the reciprocable and turnable rod 25, the said rod is permitted to slide in a vertical direction, while the arm remains in the same horizontal plane. The lower end of the turnable rod 25 detachably supports a knife blade 29. Any form of connection may be provided between the knife blade and the lower end of the rod, but in the present instance we have shown the lower end of the rod 25 as being bifurcated as at 30, to provide spaced jaws between which the upper end of the blade is received, while the set screw 31 passes through the jaws and blade to securely clamp the parts together. The knife blade 29 slides in the vertical post 32 which forms the lower part of the bracket 12 but the slot in the post 32 which receives the back portion of the blade is enlarged to accommodate the movement of the blade to alternate angular position as best seen in Figure 4, while the foot or base 11 is also slotted as at 33 for accommodating the movement of the front edge of the blade during turning of the blade to various angular positions.

From the description thus far, it will be seen that upon operation of the motor 13, reciprocation will be imparted to the rods 21 and 25, and knife blade 29 by reason of the crank 18 and links 20. In addition to imparting reciprocation to the knife blade, it is desired to simultaneously turn the blade in opposite directions to change the angularity of the same for cutting an irregular or pinking edge. This turning of the blade is accomplished in a manner now to be described.

Pivotally supported within the housing 16 is a bell crank lever 34, one arm of which terminates in a fork or yoke 35 which embraces the eccentric cam 17, while the other leg of the bell crank extends downward and is slotted as at 36. Connected to the slotted end of the bell crank lever is a link 37 which carries a screw pin 38 which passes through the slot 36. When the pin 38 is in the outer end of the slot 36 the leverage is increased, but by loosening the screw pin and sliding the link 37 upwardly so that the pin 38 engages the inner end of the slot, the leverage is reduced and is unable to operate the ratchet mechanism now to be explained.

Journaled in the housing 16 is a stub shaft 39 to which one end of an arm 40 is loosely connected, the opposite or outer end of the arm being pivotally connected to the link 37. Also mounted on the stub shaft 39 is a cam member 41 having a cam groove 42 in the periphery thereof, while fixedly connected to the cam member is a ratchet wheel 43. Engageable with the ratchet teeth of the wheel 43 is a pawl or dog 44, the same being carried by the pivot pin which connects the arm 40 with the link 37. The dog may be spring actuated or may rest upon the ratchet by gravity as best seen in Figure 2 of the drawings. Also engaging the ratchet teeth of the wheel is a dog 45 for preventing accidental retrograde movement of the ratchet wheel and its related cam element.

From the foregoing description it will be seen that when the link 37 is connected to the outer end of the slotted arm of the bell crank lever 34 the rocking movement imparted to the bell crank by reason of the eccentric 17 will be transmitted to the arm 40 through the link 37. As the arm 40 moves back and forth the dog or pawl 44 will move the cam element a predetermined distance during movement of the arm in one direction and will ride over the teeth during movement of the arm in an opposite direction so as to return to a position to again impart a clockwise rotation to the ratchet wheel and cam element. The lower end of the slotted arm of the bell crank 34 extends through an opening 46 in the front wall of the housing as seen in Figure 5 to facilitate access to the adjusting screw pin 38 to allow adjustment of the connecting link 37 which adjustment will in turn vary the amount of rotation imparted to the ratchet wheel on each actuation of the arm 40. As before stated, when the link 37 is moved to an adjusted position at the inner end of the slot 36 of the bell crank 34, the movement imparted to the link is so slight that the pawl 44 does not actuate the ratchet 43.

Extending into the cam slot 42 of the cam element is a pin or roller 47' carried by one end of a bell crank lever 47, the said lever being pivotally mounted to a bracket 48 extending from one of the walls of the housing 16. The opposite arm of the lever 47 is pivotally connected to one end of a link 49, the other end of the said link being pivotally connected to the hereinbefore mentioned arm 28 which is keyed to the turnable rod 25. It will thus be seen that the intermittent movement imparted to the cam element will cause the walls of the cam slot 42 to slide the pin or roller 47' which in turn actuates the bell crank 47 during rotation of the cam element and which movement is imparted to the arm 28 so as to impart oscillating movement to the shaft 25. It will be appreciated that as the rod 25 reciprocates, the same also turns in opposite directions so as to change the angularity of the knife blade, and when the machine is in operation, the knife blade will cut an irregular edge upon the fabric. In Figure 1 of the drawings we have shown a plurality of layers or plies of material A stacked upon a cutting table B. The line of cut is best seen in Figure 3 wherein the fabric layers A are cut to provide a wavy pinking edge C. When it is desired to cut a straight edge, the ratchet mechanism is thrown out of operation by the movement of the link 37 to a point inward of the slotted arm of the bell crank 34, it being understood that the knife blade is first adjusted to a position parallel with the length of the foot or base 11.

Instead of imparting an intermittent movement to the cam element 41, it may be desired to impart a relatively slow continuous movement to the said element, and in Figure 6 of the drawings we have illustrated a slightly modified form of drive between the motor shaft 15' and the cam 41'. Fixed to the cam 41' is a gear 43' with which a worm 60 engages. The worm 60 is fixed to a shaft 61 journaled in bearings 62 and also mounted on the shaft is a gear 63 in meshing engagement with a worm 65 carried by the motor shaft 15'. It will be seen that upon rotation of the motor shaft 15', the power is transmitted to the shaft 61, through gear 62, and then from the worm 60 to the gear 43'. This provides a slow continuous movement to the cam member 41' in lieu of the intermittent movement shown and described in the preferred form.

In Figure 7 we have illustrated a modified form of cam element 65 which is provided with a zigzag cam groove 66 in the periphery thereof and integral with the cam element is a ratchet wheel 67. In other words the cam element in Figure 7 is the same as that shown in the preferred form with the exception of the shape of the cam groove. In the modified form of cam shown in Figure 7, the shape of the groove causes the knife to cut a sharp zigzag edge on the fabric as illustrated in Figure 8 which differs from the shape of the pinking edge cut by the preferred embodiment in which the pinking edge was of a curved or waving configuration.

While we have shown and described what we deem to be the most desirable embodiment of our invention, we wish it to be understood that various changes in construction may be resorted to if desired, and we do not limit ourselves to the exact features herein shown and described, nor to anything less than the whole of our invention limited only by the appended claims.

Having thus described the invention, what we claim as new and desire to secure by Letters Patent is:—

1. In a cloth cutting machine, a vertically shiftable knife blade, means for reciprocating said knife blade, and means for imparting reverse turning movement to said knife blade about its vertical axis during reciprocation of the same.

2. In a cloth cutting machine, a knife blade, means for reciprocating said knife blade, means for imparting reverse turning movement to said knife blade about its vertical axis during each successive stroke of the same, and adjusting means for regulating the turning of said knife blade relative to the speed of reciprocation thereof.

3. In a cloth cutting machine, a reciprocable and turnable knife blade, and intermittently operating mechanism for imparting reverse movement to said knife blade during each successive cutting stroke to cause said blade to cut a continuous pinking edge upon the fabric to be cut.

4. In a cloth cutting machine, a vertically reciprocable and horizontally turnable knife blade, mechanism for imparting reverse movement to said knife blade during a cutting operation of the same to cause said blade to cut a continuous pinking edge upon the fabric to be cut, and means for rendering said mechanism inoperative to permit said knife blade to cut a straight edge.

5. A cloth cutting machine including a slidable and turnable perpendicularly disposed rod, a knife blade carried by said rod, an electric motor, means driven by said electric motor for imparting reciprocation to said rod, and a second means also operable by said electric motor for imparting reverse turning movement to said rod during each successive stroke of the rod to alternately change the angularity of said knife blade relative to the axis of said rod.

6. A cloth cutting machine including a vertically slidable and horizontally turnable rod, a knife blade carried by said rod, an electric motor, means driven by said electric motor for imparting reciprocation to said rod, a second means also operable by said electric motor for imparting reverse turning movement to said rod during reciprocation of the same to alternately change the angularity of said knife blade relative to the axis of said rod, said last means embodying an arm slidably keyed to said rod, a bell crank lever operatively connected to said arm, and cam mechanism operatively connected to said bell crank lever.

7. A cloth cutting machine including a slidable and turnable vertical rod, a knife blade having a straight horizontal cutting edge carried by said rod, an electric motor, means driven by said electric motor for imparting reciprocation to said rod, a second means also operable by said electric motor for imparting reverse turning movement to said rod during reciprocation of the same to alternately change the angularity of said knife blade relative to the axis of said rod, and means for rendering said second means inoperative.

8. A cloth cutting machine including a support, a vertical rod slidably and turnably mounted in said support, a knife blade having a straight cutting edge carried by said rod, and an electric motor mounted on said support, means driven by said electric motor for imparting reciprocation to said rod, and cam driven means operable by said electric motor for imparting reverse turning movement to said rod during reciprocation of the same.

9. A cloth cutting machine including a support, a rod slidably and turnably mounted in said support, a knife blade carried by said rod, an electric motor mounted on said support, means driven by said electric motor for imparting reciprocation to said rod, cam driven means operable by said electric motor for imparting reverse turning movement to said rod, said cam driven means embodying a rotatable cam member having a continuous cam shaped groove therein, a bell crank having one arm provided with a member slidably disposed within said groove, an arm slidably keyed to said turnable rod, and a link connecting said arm to the other arm of said bell crank lever.

10. In a cloth cutting machine, a vertically reciprocable and horizontally turnable knife blade, and cam actuated means for imparting reverse turning movement to said knife blade to cause the gradual changing of the angle of said knife blade during each successive cutting stroke.

11. In a portable cutting machine, the combination of a base movable along a surface, a motor supported on the base, a vertically reciprocable knife driven by the motor, a guide on the base for the knife permitting the said vertical reciprocation thereof and a limited lateral oscillation therefor, and means for oscillating the knife laterally relatively to the base.

HARRY LEFKOWITZ.
GABRIEL KLEIN.